US012366105B2

(12) United States Patent
Mazur et al.

(10) Patent No.: US 12,366,105 B2
(45) **Date of Patent: *Jul. 22, 2025**

(54) INSULATED PORTAL

(71) Applicant: PGT Innovations, Inc., North Venice, FL (US)

(72) Inventors: Richard Mazur, Mesa, AZ (US); Jennifer Lloyd-Randolfi, Chandler, AZ (US); Cameron Miles Wyatt, Gilbert, AZ (US); Jacob Blackburn, Phoenix, AZ (US); Kraig Hoekstra, Phoenix, AZ (US)

(73) Assignee: PGT INNOVATIONS, LLC, Harrisburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/429,566

(22) Filed: Feb. 1, 2024

(65) Prior Publication Data

US 2024/0209678 A1 Jun. 27, 2024

Related U.S. Application Data

(60) Continuation of application No. 17/500,109, filed on Oct. 13, 2021, now Pat. No. 11,927,049, which is a (Continued)

(51) Int. Cl.

| | |
|---|---|
| ***E06B 3/263*** | (2006.01) |
| ***E05B 65/00*** | (2006.01) |
| ***E06B 3/66*** | (2006.01) |

(52) U.S. Cl.

CPC .......... *E06B 3/263* (2013.01); *E05B 65/0025* (2013.01); *E06B 3/6612* (2013.01); *E05Y 2900/148* (2013.01)

(58) Field of Classification Search

CPC .... E06B 3/263; E06B 3/6612; E06B 3/26305; E06B 3/5821; E06B 2003/26329; (Continued)

(56) References Cited

U.S. PATENT DOCUMENTS

| | | | | |
|---|---|---|---|---|
| 4,253,688 A * | 3/1981 | Hosooka | E05B 65/08 | 292/52 |
| 5,171,047 A * | 12/1992 | Korb | E05C 9/16 | 292/51 |

(Continued)

FOREIGN PATENT DOCUMENTS

| | | |
|---|---|---|
| DE | 10345758 | 4/2005 |
| FR | 2908442 | 5/2008 |

OTHER PUBLICATIONS

Non-Final Office Action dated Mar. 4, 2021 in U.S. Appl. No. 16/752,530.

(Continued)

*Primary Examiner* — Omar F Hijaz

(74) *Attorney, Agent, or Firm* — Snell & Wilmer L.L.P.

(57) ABSTRACT

A method of assembling a portal can include obtaining a stile, wherein the stile can include a first stile and a second stile; arranging a thermal strut and insulative bar between the first stile and the second stile, wherein the insulative bar can define a lock groove; arranging a lock assembly within the lock groove, wherein the lock assembly can include a fastening plate rotatably coupled to the lock assembly; and coupling the lock assembly to the stile by rotating the fastening plate and, thereafter, engaging fasteners to provide friction between the fastening plate and the insulative bar.

19 Claims, 8 Drawing Sheets

Related U.S. Application Data division of application No. 16/752,530, filed on Jan. 24, 2020, now Pat. No. 11,174,668.

(60) Provisional application No. 62/798,812, filed on Jan. 30, 2019.

(58) Field of Classification Search

CPC ......... E06B 2003/2639; E06B 3/26303; E05B 65/0025; E05B 9/08; E05Y 2900/148; E05C 9/004; E05C 9/22

See application file for complete search history.

(56) References Cited

U.S. PATENT DOCUMENTS

| | | | | |
|---|---|---|---|---|
| 6,209,269 | B1 | 4/2001 | Valderrama | |
| 6,434,905 | B1 | 8/2002 | Sprague | |
| 9,995,081 | B1 * | 6/2018 | Shearman | E06B 3/9641 |
| 10,202,797 | B1 | 2/2019 | Header | |
| 11,174,668 | B1 | 11/2021 | Mazur et al. | |
| 11,927,049 | B1 | 3/2024 | Mazur et al. | |
| 2002/0053166 | A1 * | 5/2002 | Fries | E06B 3/4627 49/213 |
| 2003/0101664 | A1 * | 6/2003 | Trpkovski | E06B 3/67343 52/171.3 |
| 2006/0080894 | A1 * | 4/2006 | Saelzer | E06B 5/125 49/504 |
| 2008/0016774 | A1 * | 1/2008 | Vinadio | E05B 9/08 49/192 |
| 2009/0183449 | A1 | 7/2009 | Emiel | |
| 2014/0069034 | A1 | 3/2014 | Jones | |
| 2015/0267460 | A1 * | 9/2015 | Header | E06B 3/26303 52/204.5 |
| 2016/0251885 | A1 * | 9/2016 | Conley | E05F 11/42 49/127 |

OTHER PUBLICATIONS

Notice of Allowance dated Jul. 19, 2021 in U.S. Appl. No. 16/752,530.

Non-Final Office Action dated Feb. 14, 2023 in U.S. Appl. No. 17/500,109.

Notice of Allowance dated Nov. 1, 2023 U.S. Appl. No. 17/500,109.

* cited by examiner

INSULATED PORTAL

CROSS REFERENCE TO RELATED APPLICATIONS

This application is a continuation of, and claims priority to, and the benefit of U.S. patent application Ser. No. 17/500,109 filed, Oct. 13, 2021 entitled "INSULATED PORTAL" (hereinafter the '109 Application). The '109 Application is a divisional of U.S. patent application Ser. No. 16/752,530, filed Jan. 24, 2020, entitled "INSULATED PORTAL" (U.S. Pat. No. 11,174,668 issued on Nov. 16, 2021, hereinafter the '530 Application). The '530 Application claims priority to, and benefit of U.S. Provisional Patent Application No. 62/798,812, filed Jan. 30, 2019, entitled "INSULATED PORTAL" (hereinafter the '812 Application). The '109 Application, the '530 Application, and the '812 Application are incorporated herein by reference herein in their entireties.

TECHNICAL FIELD

This disclosure relates to windows and doors. More specifically, this disclosure relates to locksets and various mechanisms of windows and doors.

BACKGROUND

Thermally insulated windows and doors can be utilized to isolate an interior environment from an exterior environment. Although air barriers can be helpful in insulating windows, thermal conductivity of materials utilized for making such windows and doors can undermine the goals of air barriers and other insulative measures.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, a portal can include two rails and two stiles, each end of each rail connected to an end of each stile such that the portal defines a frame, wherein one stile is a hinge-side stile and one stile is a handle-side stile, the hinge-side stile being opposed to the handle-side stile in arrangement of the frame, wherein the handle-side stile can include a first stile and a second stile; a thermal strut arranged between and contacting the first stile and the second stile, the thermal strut being of an insulating material; an insulative bar arranged between and contacting the first stile and the second stile, the insulative bar being of an insulating material; and a lock assembly coupled to the insulative bar.

In another aspect, a portal assembly can include a jamb; a window assembly hingedly attached to the jamb, the window assembly including a window frame, the window frame including an upper rail and a lower rail, each rail connected to a hinge-side stile and each rail connected to a handle-side stile, wherein the handle-side stile can include a first outer stile and a second outer stile; a thermally insulative window pane captured within the frame; a thermal strut arranged between and contacting the first stile and the second stile, the thermal strut being of an insulating material; an insulative bar arranged between and contacting the first stile and the second stile, the insulative bar being of an insulating material; a lock assembly coupled to the insulative bar; and a handle operatively coupled to the lock assembly.

In another aspect, a method of assembling a portal can include obtaining a stile, the stile including a first stile and a second stile; arranging a thermal strut and insulative bar between the first stile and the second stile, wherein the insulative bar defines a lock groove; arranging a lock assembly within the lock groove, the lock assembly comprising a fastening plate rotatably coupled to the lock assembly; and coupling the lock assembly to the stile by rotating the fastening plate and, thereafter, engaging fasteners to provide friction between the fastening plate and the insulative bar.

Also disclosed is a method of assembling a portal, the method including obtaining a stile, the stile comprising at least one thermally conductive material coupled to at least one thermally insulative material; obtaining a strike assembly; and coupling the lock assembly to the stile.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
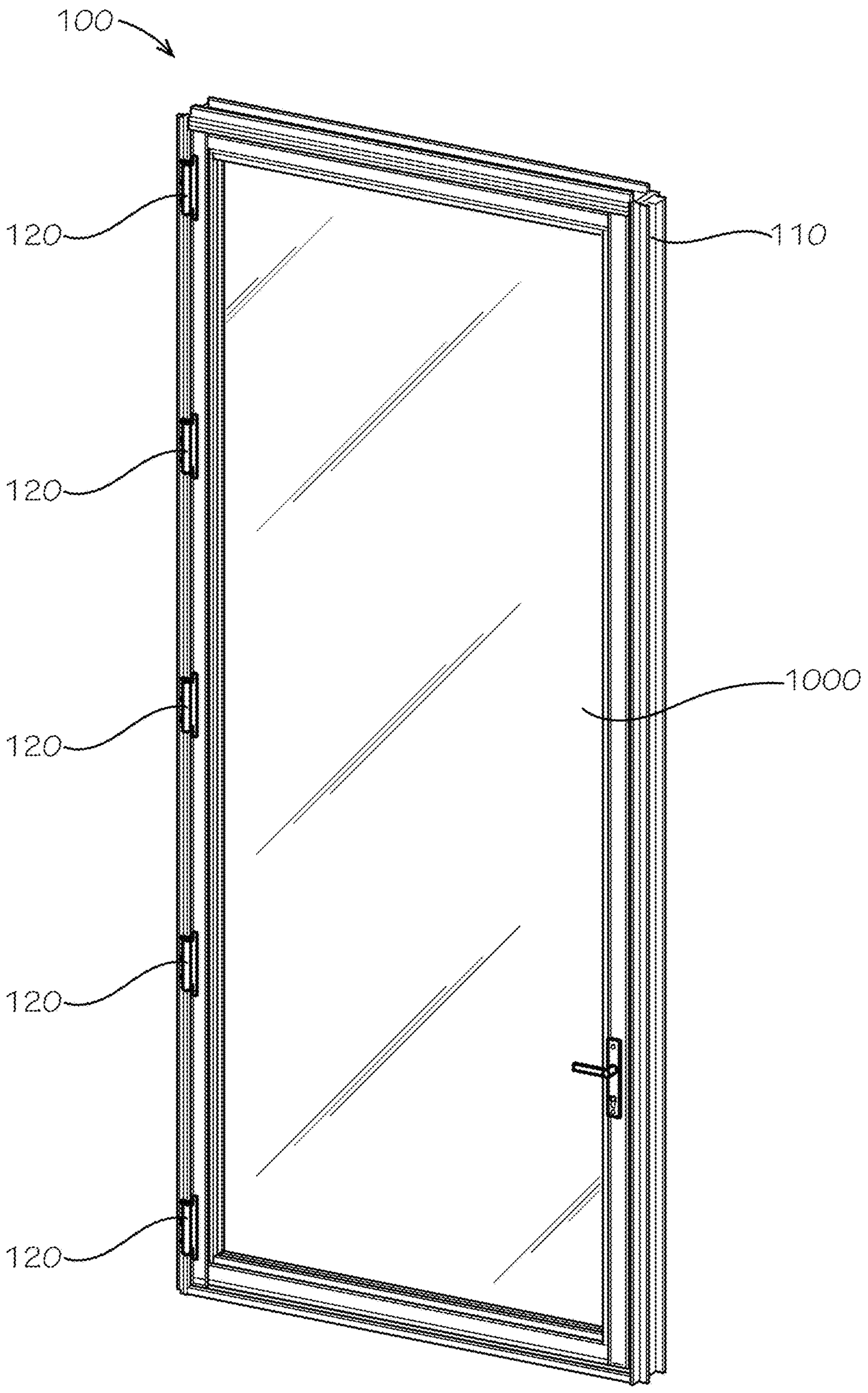
FIG. 1 is a perspective view of a portal assembly in accord with one aspect of the current disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is an insulated portal including associated methods, systems, devices, and various apparatus. The term "portal" is utilized to indicate windows, doors, or other similar types of operable or openable barriers between environments, including fenestration, chamber doors such as refrigerators, and other similar access points. The term "portal" is not intended to be limiting on the scope of the current disclosure but is included to simplify reference of the various parts that can be applicable to windows, doors, and other similar types of operable or openable barriers. The portal can include a mechanism. It would be understood by one of skill in the art that the disclosed portal is described in but a few exemplary aspects among many. No particular terminology or description should be considered limiting on the disclosure or the scope of any claims issuing therefrom.

Figure 2:
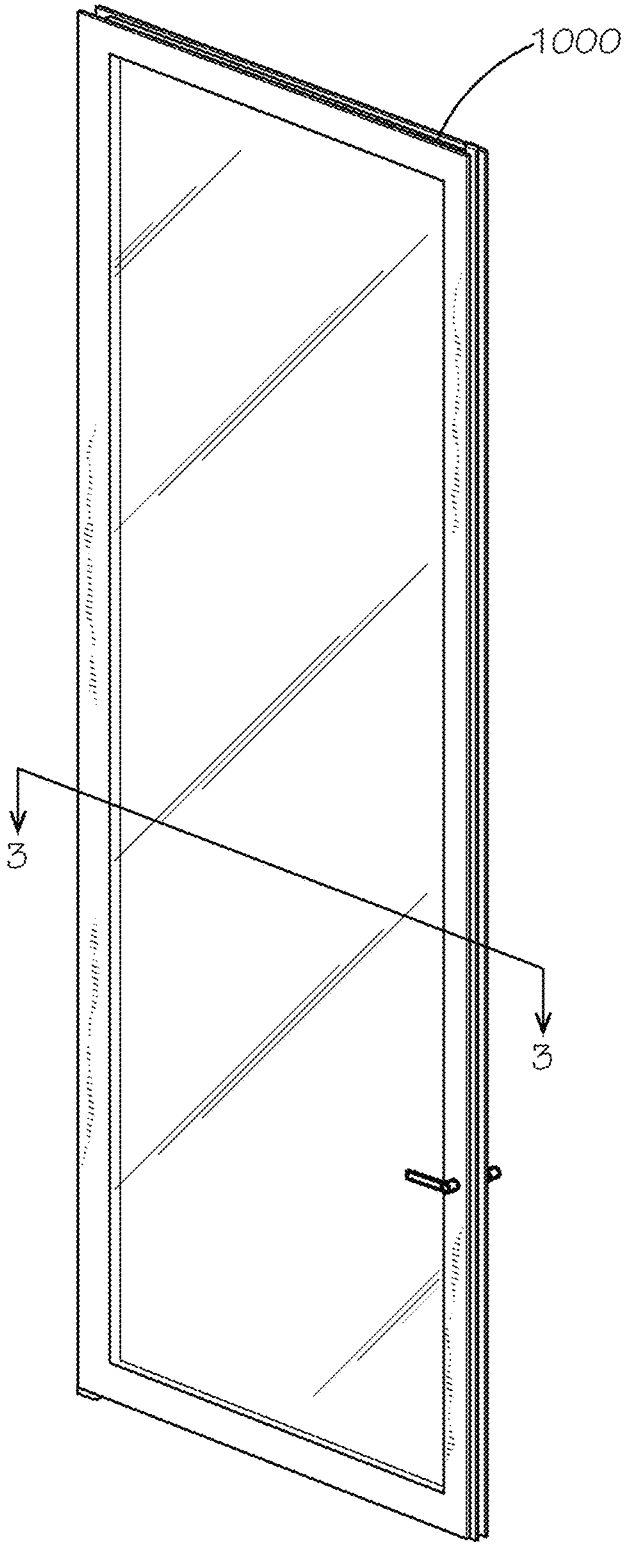
FIG. 2 is a perspective view of a portal in accordance with one aspect of the current disclosure.

One aspect of a portal assembly 100 is disclosed and described with reference to FIG. 1. The portal assembly 100 can comprise a jamb 110 attached to a portal 1000 by hinges 120. The jamb 110 can be secured to a structure—such as a house or building—such that the portal 1000 can be hingedly operated with respect to the jamb 110 and the structure. The portal 1000 can be seen without the jamb 110 with reference to FIG. 2.

Figure 3:
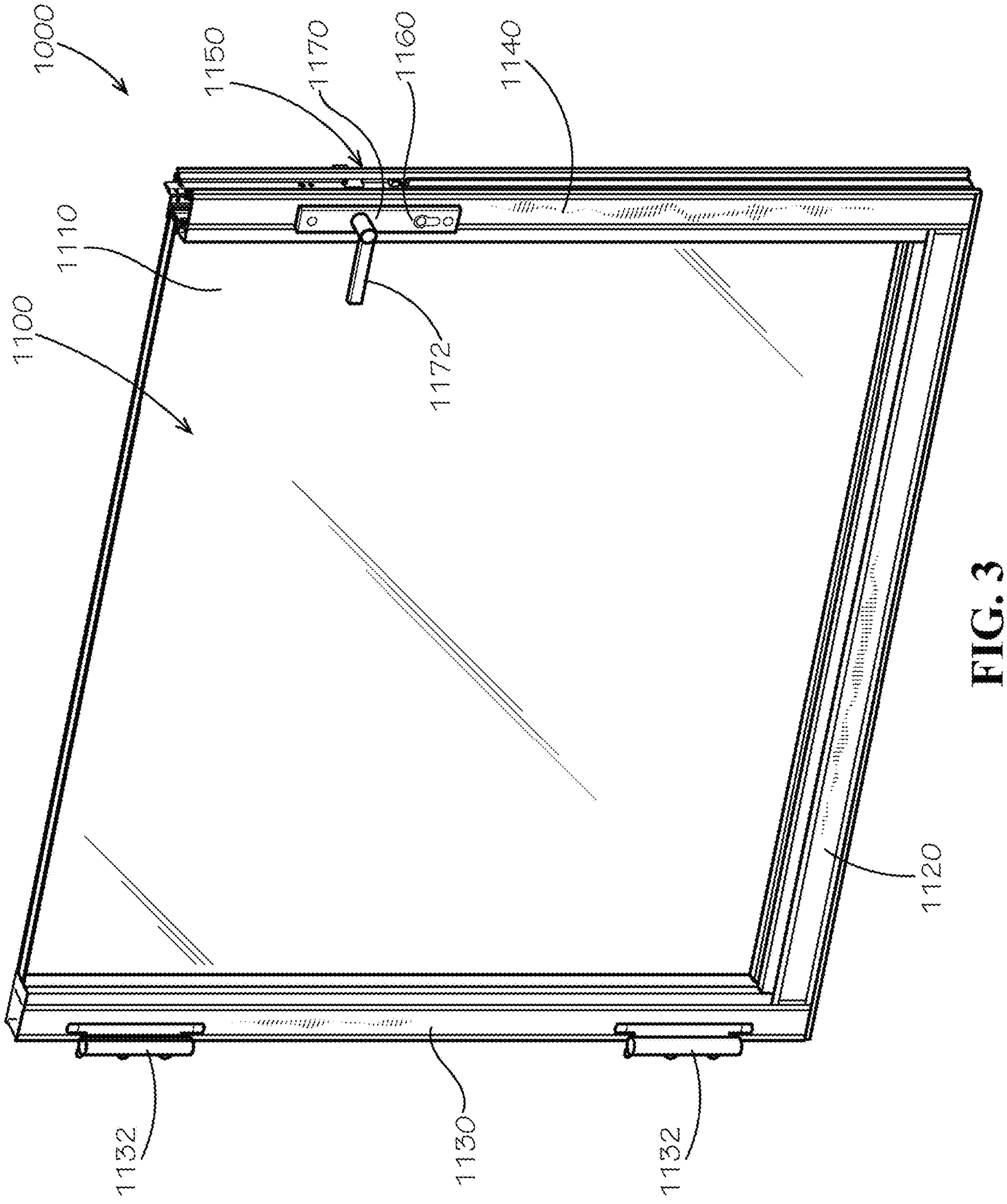
FIG. 3 is a perspective view of a lower end of the portal of FIG. 2 as seen taken along line 3-3 in FIG. 2.

One aspect of the portal 1000 is disclosed and described with reference to FIG. 3. One of skill in the art would understand that the portal 1000 could include a full window, door, or other openable or operable barrier, and the lower-half cutaway view of FIG. 3 is supplied for case of reference. The portal 1000 can comprise a sash 1100. The sash 1100 can comprise a pane 1110 that can comprise glass or another type of transparent or translucent barrier. The sash 1100 can also comprise a lower rail 1120, a hinge-side stile 1130, and a handle-side stile 1140. A plurality of hinges 1132 can be connected to the hinge-side stile 1130 for rotatable or hinged attachment to a frame, such as the jamb 110 or a similar jamb of a window or door frame. The portal 1000 can also comprise a strike portion 1150, which can itself comprise a lock mechanism 1160 and can comprise a handle mechanism 1170. In the current aspect, the lock mechanism 1160 and handle mechanism 1170 can be affixed to or connected within the stile 1140. The handle mechanism 1170 can comprise a handle 1172.

Figure 4:
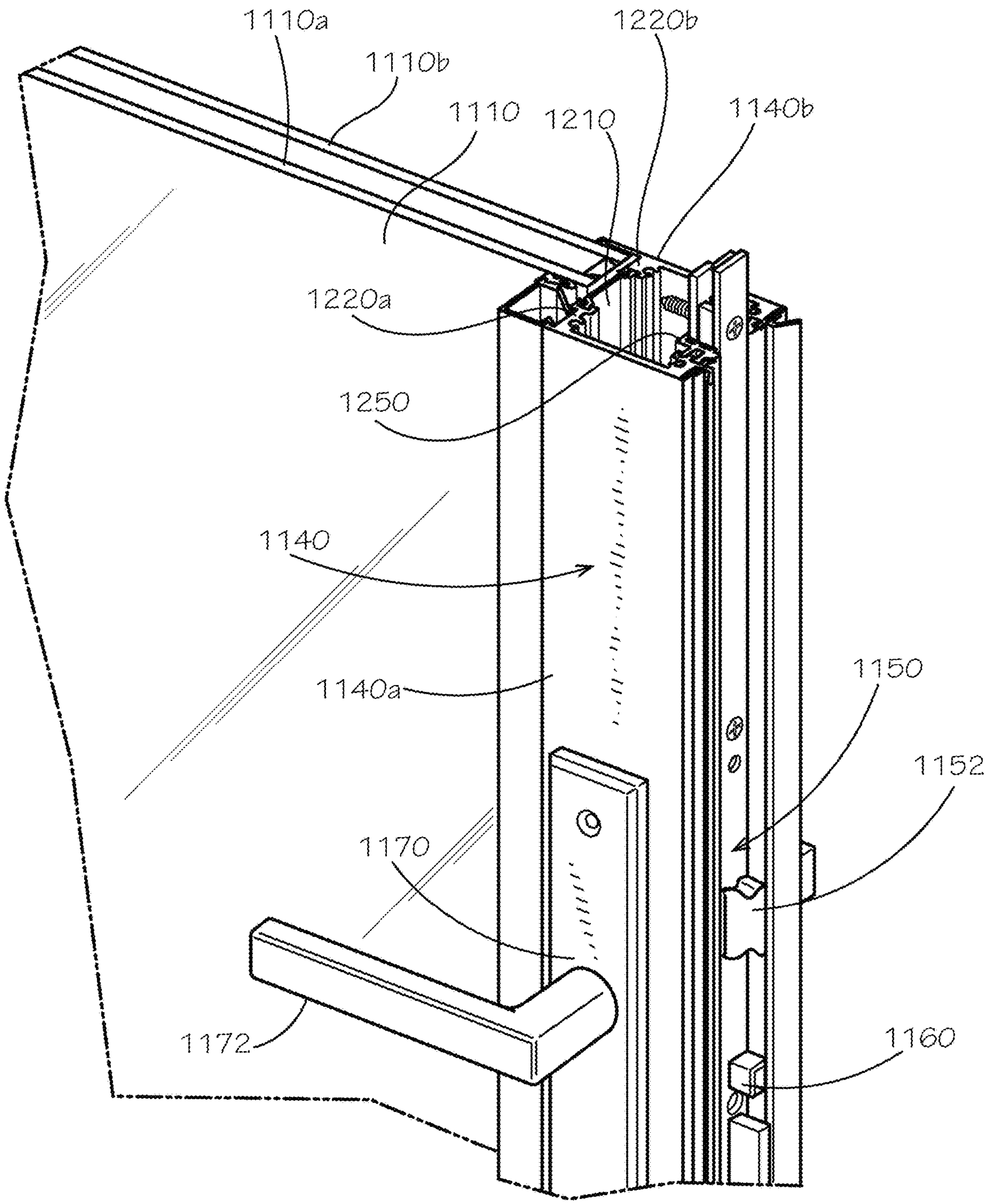
FIG. 4 is a close-up perspective view of the portal of FIG. 3.

As can be seen with reference to FIG. 4, the pane 1110 can comprise a double-pane structure having a first pane 1110*a* and a second pane 1110*b*. One of skill in the art would recognize that double-paned portals are useful for insulation purposes. Air or an inert gas—such as krypton or argon—trapped between the panes 1110*a*, 1110*b* with glazing can be an effective insulator to prevent heat transfer through the glass. A lock tongue 1152 can be seen within the lock portion 1150. The stile 1140 can comprise a first stile 1140*a* and a second stile 1140*b*. The stiles 1140 can comprise aluminum, titanium, steel, or wood, among other durable materials. One problem with such durable materials, though, is that many of them conduct heat. As such, if the stile 1140 is one piece, the environment facing the first stile 1140*a* can become thermally conducted to the second stile 1140*b*, somewhat defeating the purpose of the double-pane construction. To address the conduction, a barrier layer can be placed between the first stile 1140*a* and the second stile 1140*b*. The barrier layer can comprise a series of mechanical joints that place a material of poor thermal conductivity between the first stile 1140*a* and the second stile 1140*b* to isolate the sides of the stile 1140 from each other.

The barrier layer can comprise at least one thermal separator. The barrier layer can comprise an internal thermal strut 1210 connecting from an internal boss 1220*a*, 1220*b* from each of the first stile 1140*a* and the second stile 1140*b*. The internal thermal strut 1210 can be vinyl, glass-filled nylon, or other similar material that is generally thermally insulative and structurally desirable. The thermal strut 1210 can also be known as a thermal bar or break. A second thermal strut or insulative bar 1250 can be connected along a barrier of the stile 1140.

Figure 5:
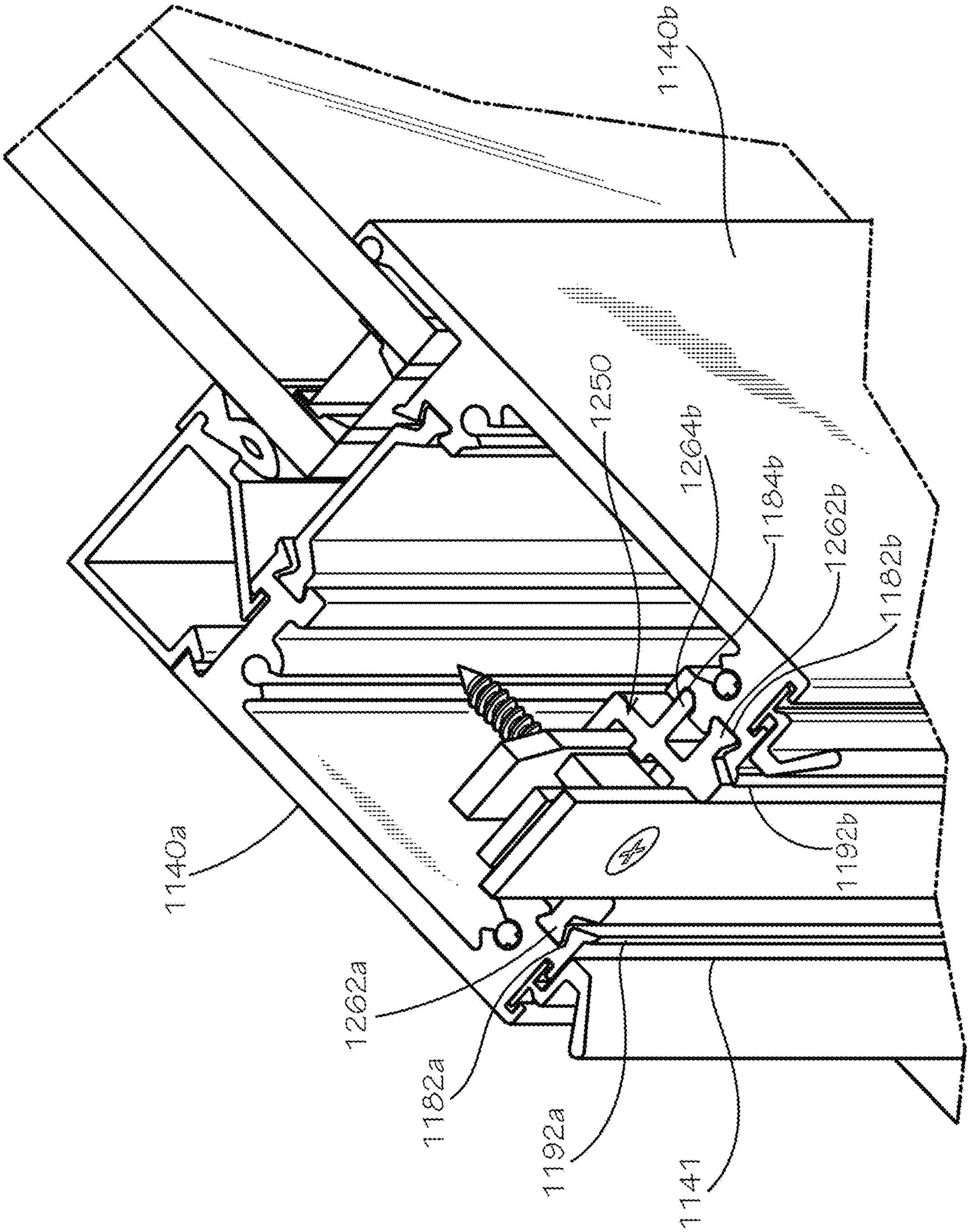
FIG. 5 is a close-up perspective view of the portal of FIG. 4 in a different arrangement.

As seen with reference to FIG. 5, the insulative bar 1250 can comprise a plurality of arms 1262*a*, 1262*b*, 1264*b* (1264*a* shown in FIG. 6) for connection with grooves 1182*a*, 1182*b*, 1184*b* (1184*a* shown in FIG. 6) defined in the first stile 1140*a* and the second stile 1140*b*. In the current aspect, the arms 1262 can comprise a dovetail groove arrangement with grooves 1182, and the arms 1264 can comprise a tongue-and-groove arrangement with grooves 1184. One of skill in the art would understand that the various arrangements can be varied or reversed, and no individual representation should be considered limiting on the disclosure. Along a lock side 1141 of the stile 1140, a crimp edge 1192*a*, 1192*b* can define a lock side edge of the groove 1182. The crimp edge 1192 can be bent to capture the dovetail groove arrangement of the arms 1262*a*, 1262*b* and the grooves 1182*a*, 1182*b*, such as by running rollers along the crimp edge 1192, thereby securing the insulative bar 1250 between the stiles 1140*a*, 1140*b*. Similarly, the thermal strut 1210 can be attached to the stiles 1140*a*, 1140*b* by use of a crimp edge.

Figure 6:
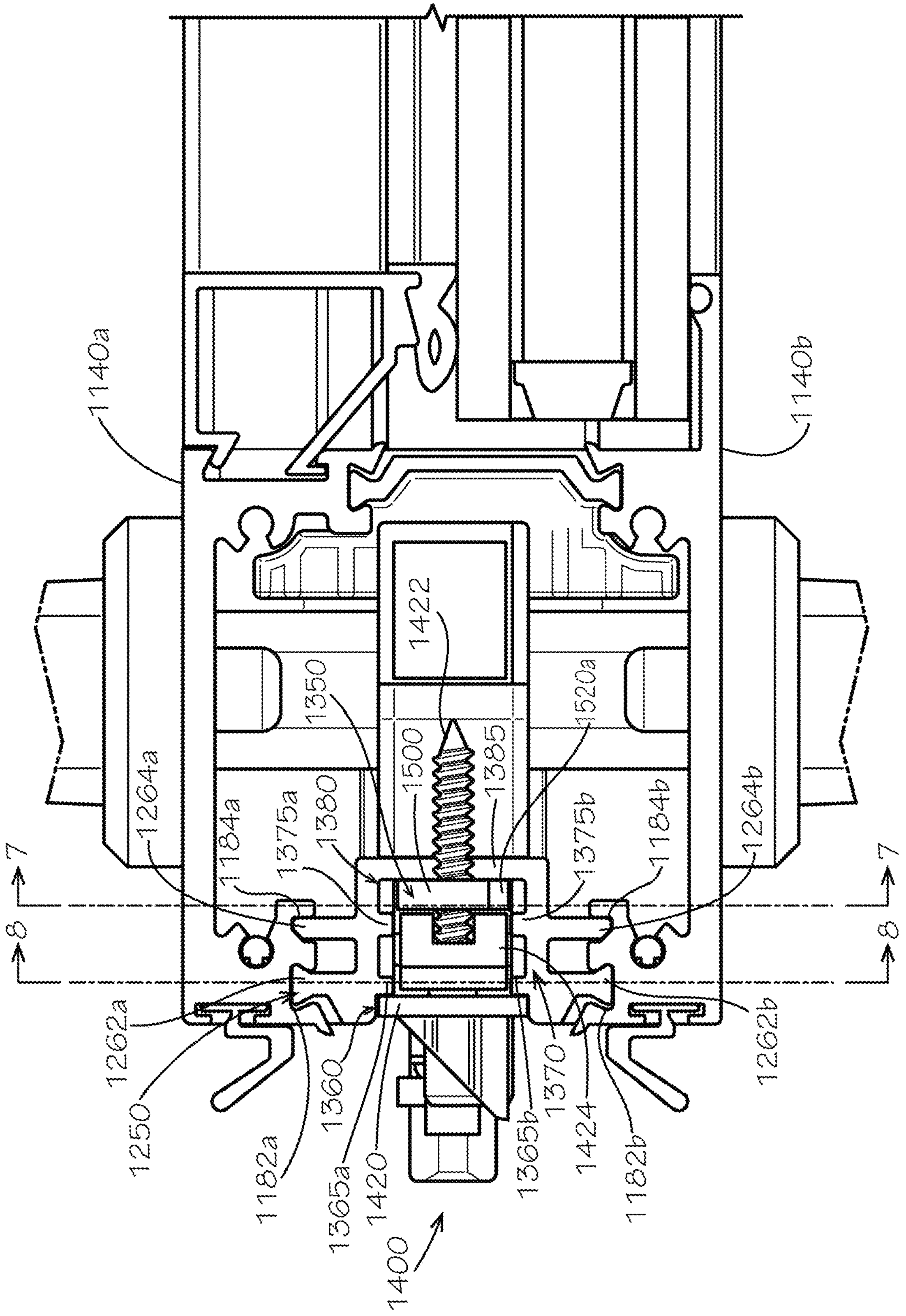
FIG. 6 is a top plan view of the portal of FIG. 3.

With reference to FIG. 6, the insulative bar 1250 can define lock groove 1350. The lock groove 1350 can sometimes be described as containing or comprising a "Euro-groove." A "Euro-groove" can comprise a series of mechanism—including locks, strikes, and other mechanisms—inserted into a groove on a lock end of a door or portal to provide adequate closing force while also making the mechanisms easily adjustable and replaceable. An additional aspect of the "Euro-groove" can be seen with reference to FIG. 8. The lock groove 1350 can itself define a space between the stiles 1140*a*, 1140*b* to allow the inclusion of various mechanisms or fillers. As shown, the lock groove 1350 can define front portion 1360, a central portion 1370, and an internal portion 1380. In the current aspect, each portion 1360,1370,1380 can be about the same width, although various arrangements are possible, and the current arrangement should not be considered limiting on the disclosure. The front portion 1360 can be separated from the central portion 1370 by a pair of bosses 1365*a*, 1365*b*. The central portion 1370 can be separated from the internal portion 1380 by a pair of bosses 1375*a*, 1375*b*. The internal portion 1380 can be defined by an internal wall 1385.

In fabrication and, in some aspects, in installation, a lock assembly 1400 can be introduced into the lock groove 1350. The lock assembly 1400 can comprise typical components of a strike and can comprise a lockset, mechanisms from the handle assembly, strike plates, fasteners, and/or various other components. The lock assembly 1400 can comprise a facing plate 1420 to interact with the bosses 1365*a*, 1365*b* in facing arrangement. The lock assembly 1400 can comprise fasteners 1422, which can be self-threading in various aspects or can be machine screws, wood screws, or various other fastening arrangements. The lock assembly 1400 can comprise spacing and framing components such as spacers 1424. The lock assembly 1400 can comprise a fastening plate 1500.

Figure 7:
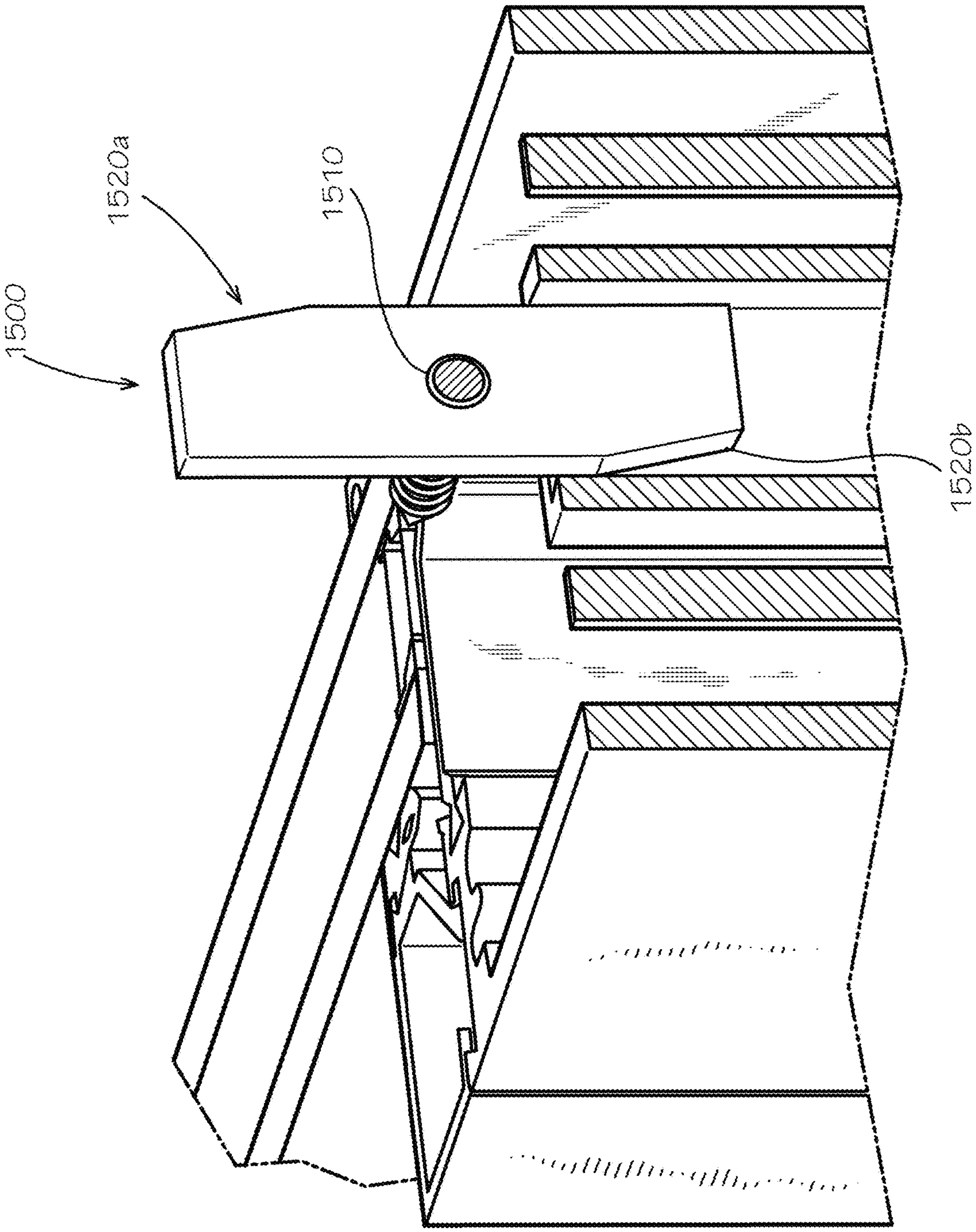
FIG. 7 is a perspective view of a fastening plate for use in the portal of FIG. 3 in environment.

As seen with reference to FIG. 7, the fastening plate 1500 can comprise a plate having a thickness sufficient to fit within the internal portion 1380 of the lock groove 1350. The fastening plate 1500 can define a fastener bore 1510, although in various aspects the fastener bore 1510 can be defined by the fastener 1422 passing through the fastening plate 1500. In various aspects, the fastener bore 1510 can be a threaded bore defined specifically for interaction with the fastener 1422. The fastening plate 1500 can be of substantially rectangular shape. In the current aspect, the fastening plate 1500 can define a relief edge 1520*a*, 1520*b* at clockwise rotation corners. In the current aspect, relief edges 1520*a*, 1520*b* can be angled, flat edges that provide space for the fastening plate 1500 to turn. In various aspects, various arrangements of relief edges 1520*a*, 1520*b* can be utilized, including catches, curves, key/fit arrangements, grooves, and holes, among others. In various aspects, the relief edges 1520*a*, 1520*b* can be textured or can comprise teeth to allow engagement of the relief edges 1520*a*, 1520*b* when in assembly.

With returning reference to FIG. 6, in assembly, the lock assembly 1400 can be introduced into the lock groove 1350 such that the facing plate 1420 contacts the bosses 1365*a*, 1365*b*. Because of the sizing and arrangement of the fastening plate 1500 with respect to the internal portion 1380 of the lock groove 1350, the fastening plate 1500 can be said to be arranged within the internal portion 1380. The fastener 1422 can be engaged by rotating as is typical for mechanical fasteners. Frictional engagement between the fastener 1422 and the fastening plate 1500 can allow the fastening plate 1500 to rotate in a clockwise direction when the fastener 1422 is utilized for tightening. Clockwise rotation of the fastener 1422 can cause clockwise rotation of the fastening plate 1500 by friction. Because of the arrangement of the relief edges 1520*a*, 1520*b*, the fastening plate 1500 can be allowed to rotate within the internal portion 1380, and portions of the fastening plate 1500 proximate to the relief edges 1520*a*, 1520*b* can become engaged in the internal portion 1380 behind the bosses 1375*a*, 1375*b*. Further tightening on the fastener 1422 can provide further engagement of the fastening plate 1500 into the bosses 1375*a*, 1375*b*, thereby securing the lock assembly 1400 within the lock groove 1350.

Once installed, the portal 1000—and, specifically, the lock assembly 1400 and its interaction with the lock groove 1350—can reach a forced intrusion rating of at least 850 pounds, and in many cases far greater ratings. In installation, the lock assembly 1400 can be adjusted at least ⅜ inches up or down to accommodate varying locations of mechanisms within jambs and within internal framework of the portal 1000. The lock assembly 1400 can also be arranged flush with the lock side 1141 of the portal 1000, leading to an aesthetically pleasing affect. Such an arrangement can help decouple the highly thermally-conductive materials of one side of the portal 1000 from the other side of the portal 1000.

Figure 8:
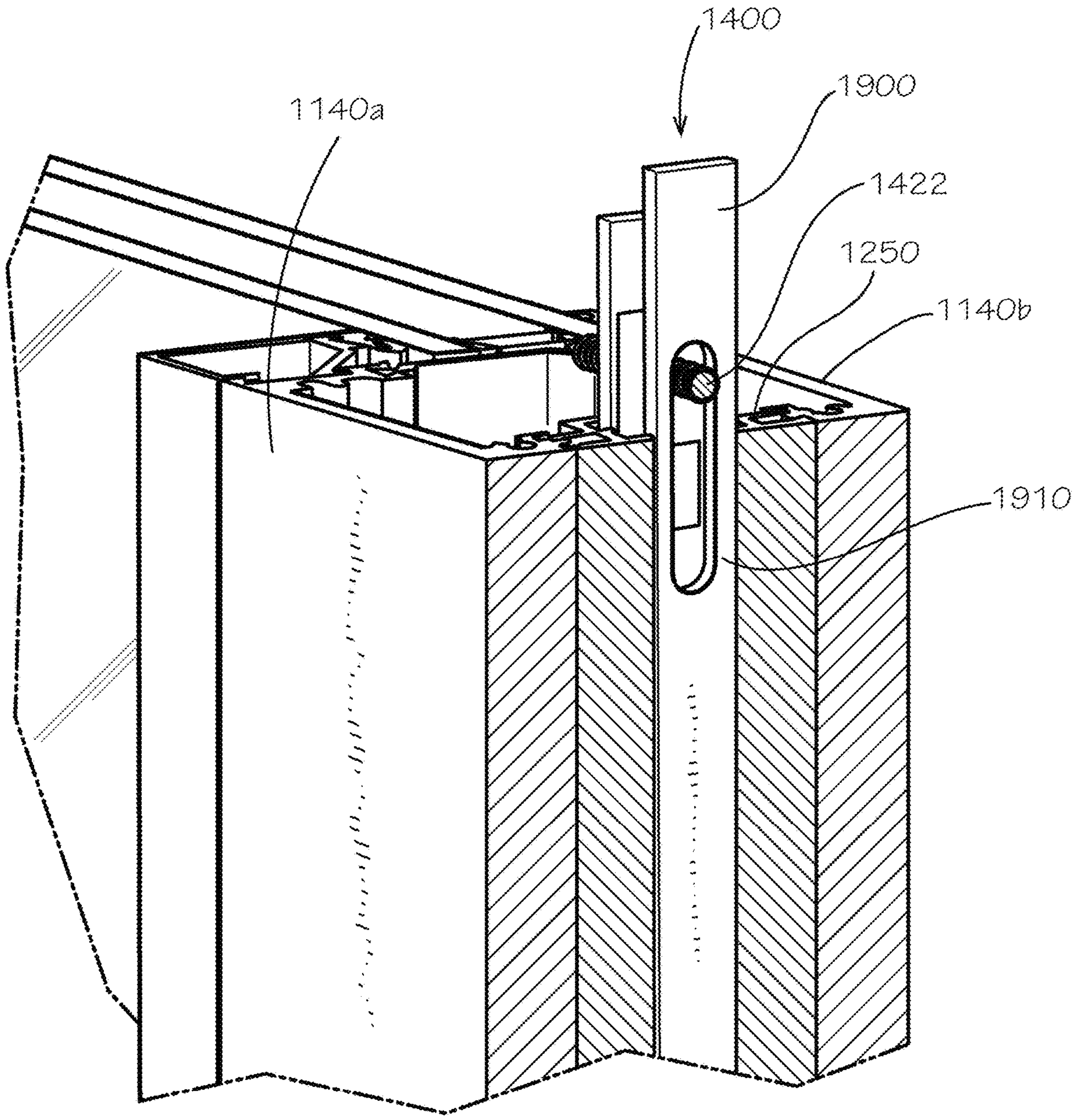
FIG. 8 is a perspective view of a cam bar positioned in the portal of FIG. 3.

As seen with reference to FIG. 8, a cam bar 1900 can be included within the lock assembly 1400. The cam bar 1900 can be actuated by motion of the handle or other mechanisms within the lock assembly 1400. The cam bar 1900 can define a motion relief 1910 to allow motion of the cam bar

1900 without interfering with fasteners 1422, such as to engage a lock tongue at one end of the portal 1000 with a strike in the frame in which the portal 1000 is mounted.

One of skill in the art would understand that the rails (including lower rail 1120 and an upper rail not referenced herein) can be similarly arranged and insulated as with the stiles 1130, 1140.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

We claim:

1. A method of assembling a portal, the method comprising:

obtaining a thermally insulative window pane;

capturing the thermally insulative window pane within a window frame, the window frame comprising an upper rail and a lower rail, each rail connected to a hinge-side stile and each rail connected to a lock-side stile, wherein the lock-side stile comprises a first outer stile and a second outer stile;

arranging a thermal strut between and contacting the first outer stile and the second outer stile, the thermal strut being of an insulating material;

arranging an insulative bar between and contacting the first outer stile and the second outer stile, the insulative bar includes a pair of bosses at least partially defining a lock groove, and the insulative bar being of an insulating material;

arranging a lock assembly within the lock groove, the lock assembly includes a facing plate configured to contact the pair of bosses, and the lock groove is sized to accept the lock assembly; and coupling the lock assembly to the insulative bar.

2. The method of claim 1, wherein the thermally insulative window pane comprises at least two panes separated in thermally insulative arrangement.

3. The method of claim 2, wherein the thermally insulative separation of the at least two panes comprises a vacuum between the at least two panes.

4. The method of claim 2, wherein the thermally insulative separation of the at least two panes comprises an insulative gas between the at least two panes.

5. The method of claim 1, wherein arranging the insulative bar between and contacting the first outer stile and the second outer stile includes contacting the first outer stile with a first plurality of arms of the insulative bar and contacting the second outer stile with a second plurality of arms of the insulative bar.

6. The method of claim 1, further comprising fastening the facing plate to the insulative bar with a fastener.

7. The method of claim 1, wherein the lock groove defines a front portion, a central portion, and an internal portion, wherein the step of arranging the lock assembly within the lock groove further comprises fastening the lock assembly to the lock groove by arranging a fastening plate in contact with the internal portion of the lock groove.

8. The method of claim 7, wherein the fastening plate defines at least one relief edge, the relief edge being an angled edge arranged to allow rotation of the fastening plate within the internal portion.

9. The method of claim 8, wherein the step of arranging the fastening plate in contact with the internal portion of the lock groove further comprises arranging the angled edge in contact with the internal portion of the lock groove.

10. The method of claim 9, wherein the front portion is separated from the central portion by a first pair of bosses and wherein the internal portion is separated from the central portion by a second pair of bosses.

11. A portal comprising:

a window frame comprising an upper rail and a lower rail, each rail connected to a hinge-side stile and each rail connected to a lock-side stile, wherein the lock-side stile comprises a first outer stile and a second outer stile;

a thermally insulative window pane captured within the window frame;

a thermal strut disposed between and contacting the first outer stile and the second outer stile, the thermal strut being of an insulating material;

an insulative bar disposed between and contacting the first outer stile and the second outer stile, the insulative bar includes a pair of bosses at least partially defining a lock groove, and the insulative bar being of an insulating material; and a lock assembly coupled to the insulative bar and disposed within the lock groove, the lock groove is sized to accept the lock assembly, and the lock assembly includes a facing plate configured to contact the pair of bosses.

12. The portal of claim 11, wherein the thermally insulative window pane comprises at least two panes separated in thermally insulative arrangement.

13. The portal of claim 12, wherein the thermally insulative separation of the at least two panes comprises a vacuum between the at least two panes.

14. The portal of claim 12, wherein the thermally insulative separation of the at least two panes comprises an insulative gas between the at least two panes.

15. The portal of claim 11, wherein the insulative bar further includes a first plurality of arms contacting the first outer stile and a second plurality of arms contacting the second outer stile.

16. The portal of claim 11, wherein the facing plate is fastened to the insulative bar with a fastener.

17. A method of assembling a portal, the method comprising:

obtaining a thermally insulative window pane;

capturing the thermally insulative window pane within a window frame, the window frame comprising an upper rail and a lower rail, each rail connected to a hinge-side stile and each rail connected to a lock-side stile, wherein the lock-side stile comprises a first outer stile and a second outer stile;

arranging a thermal strut between and contacting the first outer stile and the second outer stile, the thermal strut being of an insulating material;

arranging an insulative bar between and contacting the first outer stile and the second outer stile including contacting the first outer stile with a first plurality of arms of the insulative bar and contacting the second outer stile with a second plurality of arms of the insulative bar includes a pair of bosses at least partially, the insulative bar defining a lock groove, and the insulative bar being of an insulating material;

arranging a lock assembly within the lock groove, the lock groove is sized to accept the lock assembly; and coupling the lock assembly to the insulative bar.

18. A method of assembling a portal, the method comprising:

obtaining a thermally insulative window pane;

capturing the thermally insulative window pane within a window frame, the window frame comprising an upper rail and a lower rail, each rail connected to a hinge-side stile and each rail connected to a lock-side stile, wherein the lock-side stile comprises a first outer stile and a second outer stile;

arranging a thermal strut between and contacting the first outer stile and the second outer stile, the thermal strut being of an insulating material;

arranging an insulative bar between and contacting the first outer stile and the second outer stile, the insulative bar defining a lock groove, and the insulative bar being of an insulating material;

arranging a lock assembly within the lock groove, the lock groove is sized to accept the lock assembly, the lock groove defining a front portion, a central portion, and an internal portion, wherein the step of arranging the lock assembly within the lock groove comprises fastening the lock assembly to the lock groove by arranging a fastening plate in contact with the internal portion of the lock groove; and coupling the lock assembly to the insulative bar.

19. A portal comprising:

a window frame comprising an upper rail and a lower rail, each rail connected to a hinge-side stile and each rail connected to a lock-side stile, wherein the lock-side stile comprises a first outer stile and a second outer stile;

a thermally insulative window pane captured within the window frame;

a thermal strut disposed between and contacting the first outer stile and the second outer stile, the thermal strut being of an insulating material;

an insulative bar disposed between and contacting the first outer stile and the second outer stile, the insulative bar includes a pair of bosses at least partially defining a lock groove, a first plurality of arms contacting the first outer stile, and a second plurality of arms contacting the second outer stile, and the insulative bar being of an insulating material; and a lock assembly coupled to the insulative bar and disposed within the lock groove, the lock groove is sized to accept the lock assembly.

* * * * *